INVENTOR.
GAYLORD W. BROWN

BY

INVENTOR.
GAYLORD W. BROWN
BY Learman & McCulloch

United States Patent Office 3,669,809
Patented June 13, 1972

3,669,809
APPARATUS AND METHODS FOR FRICTION WELDING PLASTIC PARTS WHICH REQUIRE A PARTICULAR RELATIVE ANGULAR ORIENTATION
Gaylord W. Brown, Beaverton, Mich., assignor to Koehring Company
Filed Aug. 13, 1969, Ser. No. 849,732
Int. Cl. B30b 3/02; B32b 31/22
U.S. Cl. 156—582
16 Claims

ABSTRACT OF THE DISCLOSURE

Friction welding machinery and methods wherein axially aligned part holders hold synthetic plastic parts which are to be friction welded together. The part holders are relatively rotated and a speed sensor, in the form of radially expansible and contractable stop fingers, operates under the influence of centrifugal force to indicate when the relative speed of the parts is such that friction welding is occurring and traps a stop located in a predetermined position such that one of the part holders is stopped in a predetermined angular position relative to the other. The trap fingers are carried by the holder for the part which requires location and the stop may be carried by the other holder or mounted on the frame of the machine.

---

One of the prime objects of the present invention is to design rotary friction welding apparatus and methods wherein synthetic plastic parts which are thermoplastic in character may be friction welded together in a particular relative angular orientation. Typical plastics, adaptable to the process to be described, are polystyrene, polyethylene and polypropylene, but many other plastics may also be friction welded according to the invention. Specifically the plastic parts to be welded together may comprise a series of parts to be welded to another part with each of the series of parts to have portions ultimately fixed in parallel disposition.

Another object of the invention is to provide highly reliable, and yet simple and efficient, apparatus for friction welding parts of the character described wherein means responsive to the progress of the friction welding operation is provided which indicates when the relative rotation of the parts should be halted to locate the parts in the desired angular relationship.

Briefly the invention comprises: axially aligned part holders for holding parts to be friction welded together; mechanism for relatively revolving the part holders; and mechanism for stopping the relative rotation of the part holders to achieve a friction weld wherein the parts are angularly disposed in a particular position relative to one another.

While other objects and advantages of the invention will become apparent with reference to the accompanying drawings, specification and claims.

Figure 2:
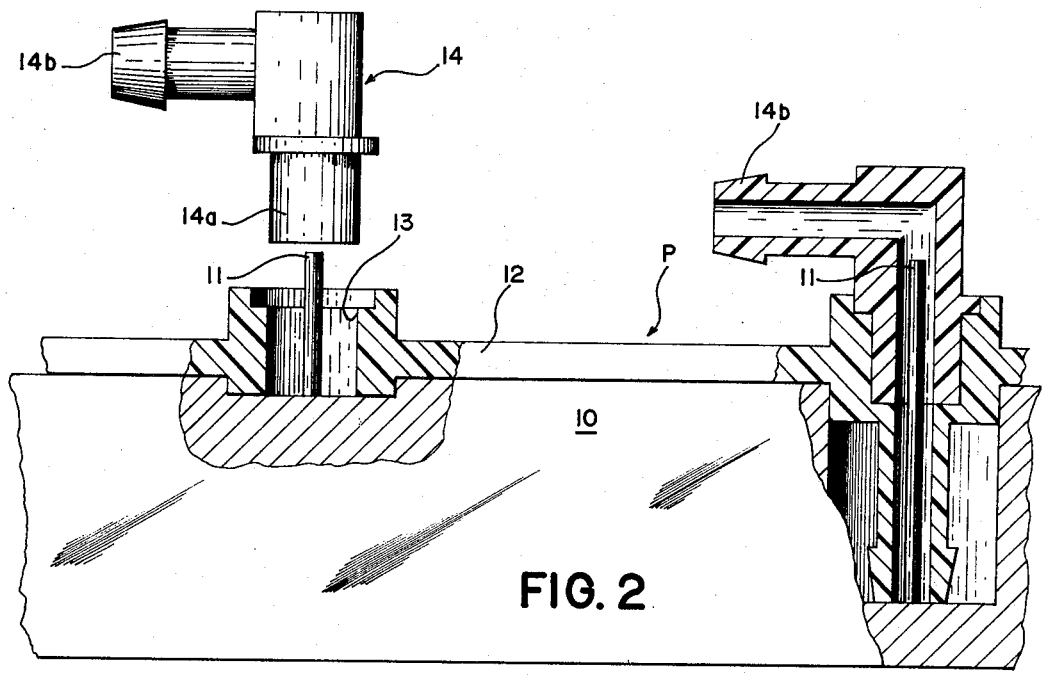
FIG. 2 is a considerably enlarged, fragmentary, side elevational view, partly in section, and illustrating the holder plate, the base plate of the part, and the parts which are being friction welded thereto, the fitting to be welded to the base plate being shown in removed position.
Figure 1:
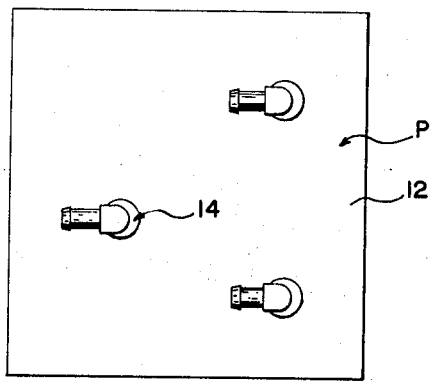
FIG. 1 is a top plan view showing a completed part with the three fittings friction welded in position thereon.

Referring now more particularly to the accompanying drawing, and in the first instance to FIGS. 1 and 2, a letter P generally indicates a plastic part which in FIG. 2, is shown mounted on a part supporting plate or platform 10 having a plurality of upwardly extending metal locating pins 11 thereon. The synthetic plastic part generally designated P comprises a thermoplastic base plate 12 having a plurality of receiving sockets 13 for receiving thermoplastic fittings generally designated 14. The synthetic plastic fittings 14 have enlarged cylindrical base portions 14a which are to be received within the sockets 13 and friction welded in a particular angular position. It will be observed that the fittings 14 include nozzle portions 14b and it is to be understood that these must be angularly fixed in a particular angular orientation on the completed part. In the completed part (see FIG. 1) each of the nozzle portions 14b is so oriented that it extends in the same direction parallel to the other nozzle portions 14b. It will further be observed that each of the fittings 14, shown friction welded in position in FIG. 1, is not equidistantly circumferentially spaced from the other. In FIG. 2, the part P is shown as having a fitting 14 friction welded in position at the right, and a fitting 14 about to be friction welded in position at the left. The remaining socket 13 will be supplied with a fitting 14 in a subsequent operation. The apparatus which will be described is employed for friction welding a single fitting 14 at a time, after which the part P must be removed from the platform 10 and revolved to dispose another socket 13 in a rotary position for friction welding.

Figure 3:
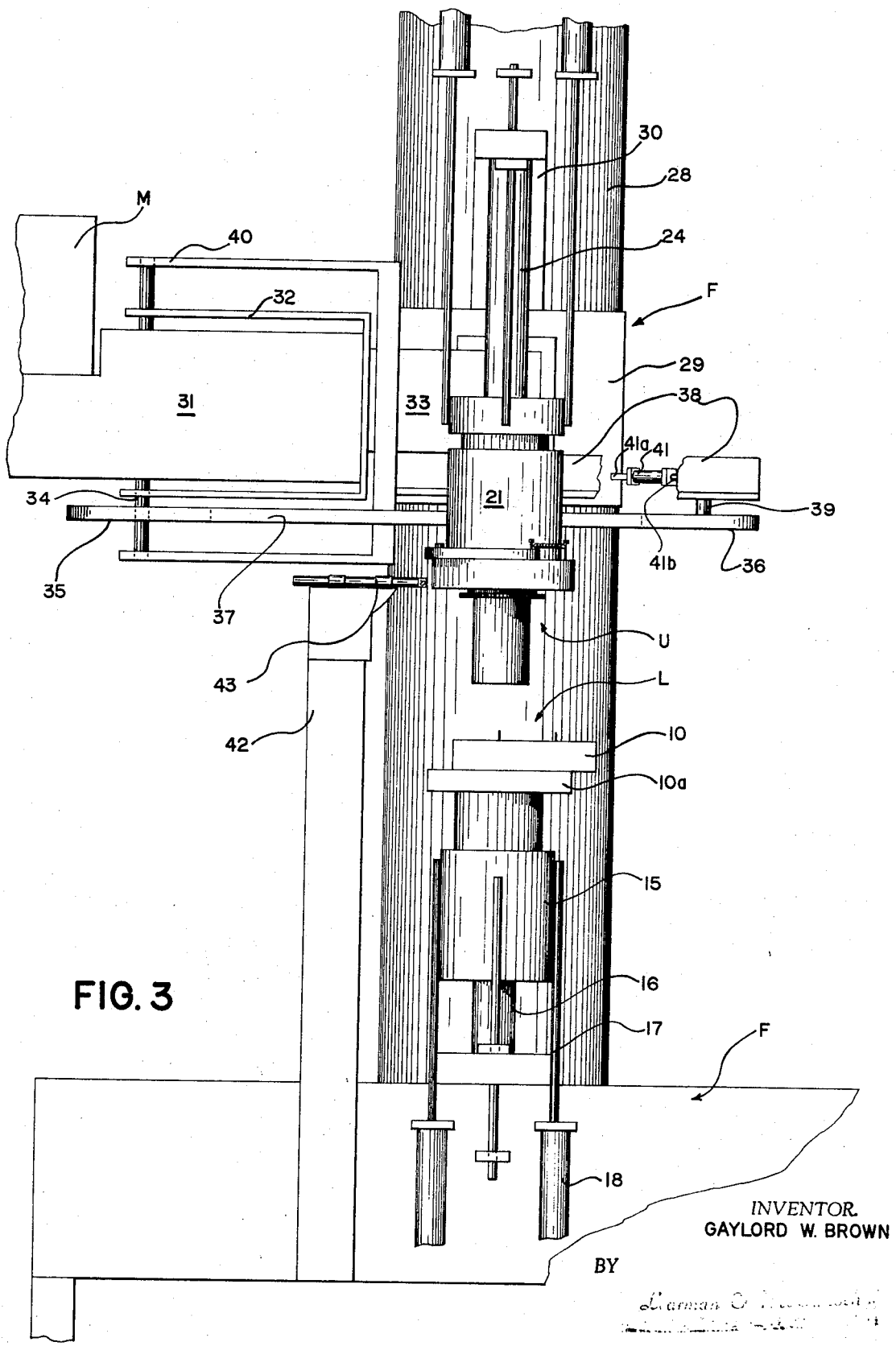
FIG. 3 is a side elevational view schematically depicting a friction welding machine of the character mentioned, the parts to be welded being omitted in the interests of clarity.
Figure 4:
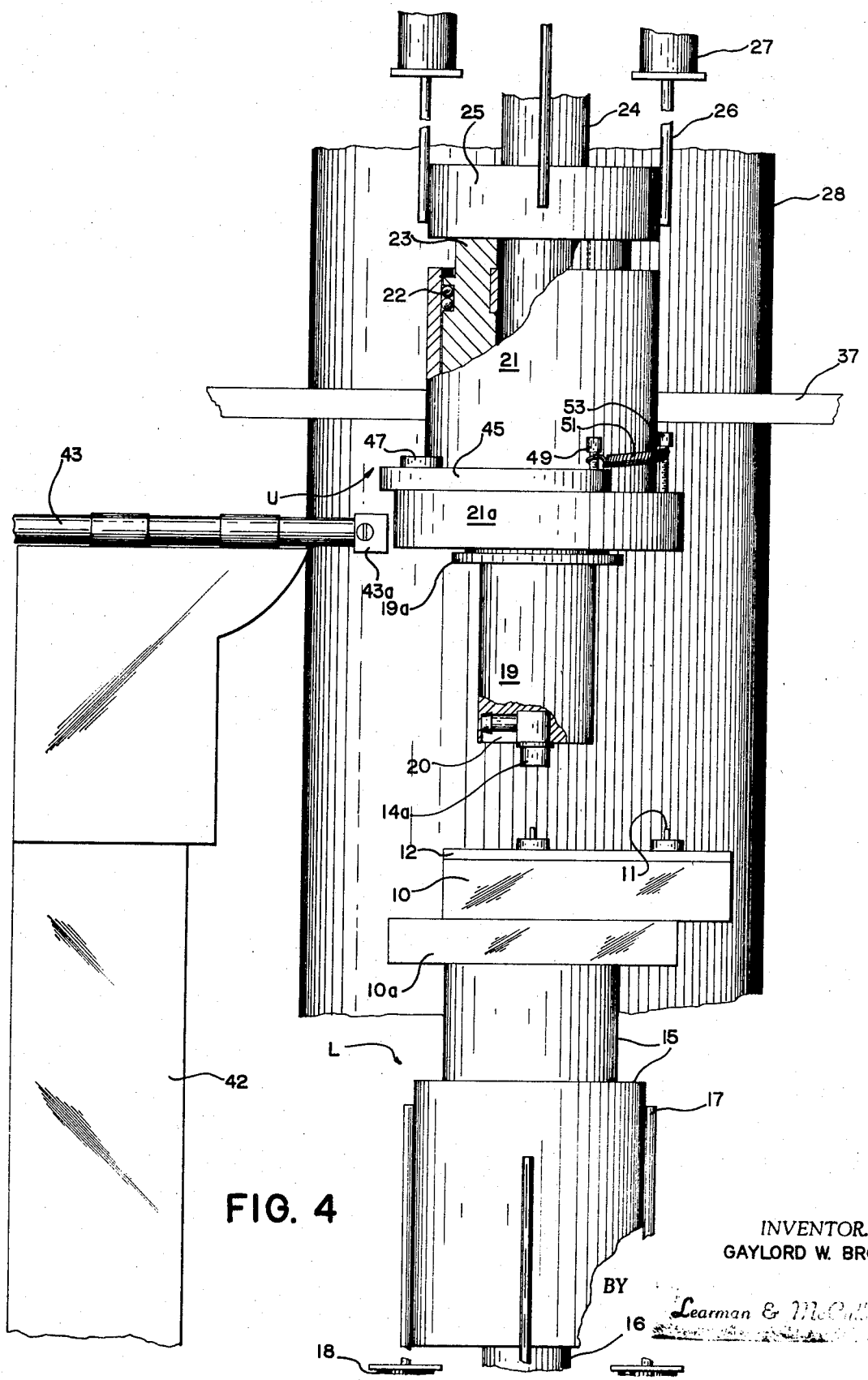
FIG. 4 is a similar fragmentary view showing the parts to be welded mounted respectively on the upper and lower work holders.

As FIG. 3 particularly indicates, the part supporting platform 10 comprises the upper portion of a lower part holding assembly generally designated L and is mounted in a predetermined position on a support plate 10a which is fixed on a non-rotatable vertical slide 15. The slide 15 is mounted for vertical axial travel on a fixed guide rod 16, supported from the machine frame generally designated F in any suitable manner, and is moved vertically by the piston rods 17 of pneumatic cylinders 18 which are also mounted on the framework shown generally at F in any suitable fashion. The part supporting platform 10 is accordingly movable vertically upwardly and downwardly under the control of the fluid pressure operated cylinders 18 but, as noted, is prevented from moving in a rotary path. The slide 15, for instance, may be keyed to the stationary slide shaft 16 on which it is mounted for vertical travel. It is to be understood that when a particular socket portion 13 is in the welding position, indicated at 13', in FIG. 4, that it is concentrically disposed with relation to the axis of slide 15.

Provided concentrically in alignment with the lower slide 15 is an upper part holding assembly generally designated U including a part holding tool member 19 having a socket portion 20 configured to snugly receive the upper portion of a fitting 14, and it is to be understood that the part holding member 19 carries the part 14 in a position such that the cylindrical portion 14a is concentric with the socket 13 in which it is to be received. The fitting 14 may be simply a friction fit within the socket 20 which receives and accordingly holds it. The upper holder 19 includes a collar portion 19a which may be fixed in any convenient manner to a spindle 21 having an enlarged support flange 21a as shown. The spindle 21, including the part support tool 19, is journaled by suitable bearing members 22 for rotation on an upper slide 23 which is mounted for vertical axial travel on a stationary post 24 carried on the frame F of the machine in a manner to be described. The slide 23, which carries the spindle 21, is movable vertically up and down on the stationary post 24 and connects to the ring 25 joining the slide 23 to the piston rods 26 of the fluid pressure operated cylinders 27 which are provided for moving the assembly U upwardly and downwardly.

A support post 28 forms a part of the frame F and extends upwardly as shown in FIG. 3. Provided on the support post 28 is a support collar 29 which is utilized to mount the upper part holding assembly U in the desired vertical position. Depending on the axial length of the parts to be friction welded, the collar 29 may be adjusted vertically on the post 28 and secured in any suitable manner in vertically adjusted position. The slide guide support post 24 is connected with and supported from the collar 29 by an angle shaped bracket 30 as FIG. 3 indicates. Also supported by the collar 29 is a motor M and power transmission unit 31, coupled thereto, which are supported from the collar 29 via a yoke shaped member 32 and an extending support arm 33 connecting thereto. The output shaft 34 of the power transmission unit 31 mounts a pulley 35 which is connected to drive a pulley 36 via a belt 37, which as will later appear, is movable into and out of driving engagement with the spindle 21. An arm member 38 is provided to support a shaft 39 for pulley 36 and it will be seen that the arm 38 connects with a yoke 40 which journals the ends of shaft 34 and is pivotal thereon. A double acting air cylinder 41, pivotally connected to the collar 29 at end 41a, is pivotally connected at its opposite end, at 41b, to the arm 38 and opeartes to swing the arm 38 and pulley 36 outwardly and inwardly about shaft 34 as a pivot. When the cylinder 41 moves the pulley 36 outwardly, it causes the belt 37 to move into driving engagement with spindle 21 to cause the spindle 21 to rotate at the desired speed, prior to bringing the parts into friction welding position. As will later appear, the cylinder 41 is operated to return the pulley 36 and remove belt 37 from driving engagement with spindle 21 just before the upper part holding assembly U is moved downwardly to engage the part 14 in the socket 13.

Figure 6:
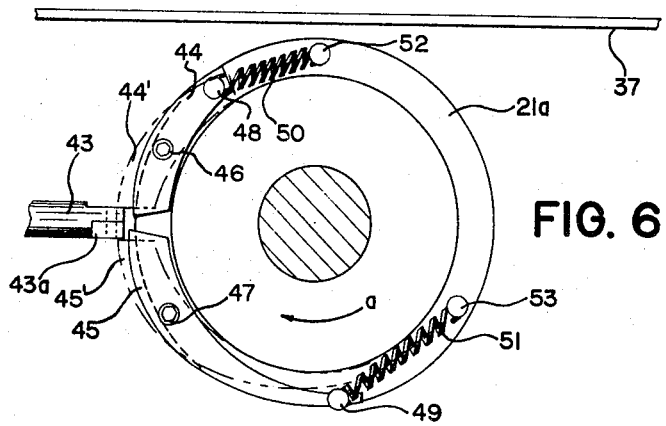
FIG. 6 is a fragmentary top plan view taken on the line 6—6 of FIG. 5; the centrifugally actuated trapping fingers being, however, shown in solid lines in the position in which they are disposed prior to the completion of the friction welding operation.

As FIG. 3 indicates, the frame F also incorporates a stop holding post 42 on which a laterally or radially projecting fixed stop pin 43 is mounted. As FIG. 6 particularly indicates, the stop pin 43 is in a position to be engaged between a pair of trap fingers 44 and 45 when the fingers 44 and 45 are in the outwardly pivoted position indicated at 44' and 45'. Fingers 44 and 45 are pivotally mounted on the flange 21a by pivot pins or bolts 46 and 47, respectively, and have posts 48 and 49, respectively, at their rear ends to enable them to be connected by springs 50 and 51 to posts 52 and 53 fixed on the flange 21a.

In operation, the part 12 is loaded to the support plate 10 and a fitting 14 is loaded to the receiving socket 20 in the part holding tool 19 while the upper and lower part holding assemblies U and L are in the spaced apart position shown in FIG. 3. Thereafter, the air cylinder 41 is energized to swing the belt 37 from the disengaged position shown in FIG. 6 over into an engaged position to bring the spindle 21 up to the desired speed which may be in the nature of 5,000 revolutions per minute. This occurs almost at once and cylinder 41 is then deenergized so that the belt 37 is swung back to disengaged position. Cylinders 18 are energized to advance piston rods 17 and move the lower part holding assembly L upwardly and cylinders 27 are then energized to advance the pistons rods 26 and move the upper part holding assembly U downwardly to seat the fitting portions 14a within sockets 13. At this time the fingers 44 and 45 are in the solid line positions shown in FIG. 6 under the influence of centrifugal force, the portions of fingers 44 and 45 rearwardly of pivot pins 46 and 47 being heavier than the portions forwardly of the pivot pins, or, stated differently, the trailing portion of finger 45 and the leading portion of finger 44, considering the direction of rotation a, are heavier so that centrifugal force disposes fingers 44 and 45 in the solid line position shown in FIG. 6 due to the speed of rotation of the spindle 21 and fixture 14 during most of the friction welding operation. During relative rotation of the parts, a tackiness is achieved which tends to stop the rotation as the parts heat and approach friction welding temperature. The springs 50 and 51 are so chosen, with regard to the force exerted by them, that at about the time the part 14 has one more revolution prior to a weld being completed, when rotation of course ceases, that they will overcome the centrifugal forces exerted at such a lower speed and cause the fingers 44 and 45 to move to the positions 44' and 45'. As rotation in the last revolution occurs, fingers 44 will slip pass the stop 43, while finger 45 will, upon engaging the stop 43, positively halt the rotation of spindle 21 and part 14. Fnger 44 will prevent the spindle 21 from rebounding in a reverse counterclockwise direction upon being positively halted in this manner. Thus, the fingers 44 and 45 effectively trap the stop 43 to halt rotation at this point so that there is no tendency to break the friction weld which is achieved. A urethane cushion part 43a may be provided on stop 43 as shown.

Figure 5:
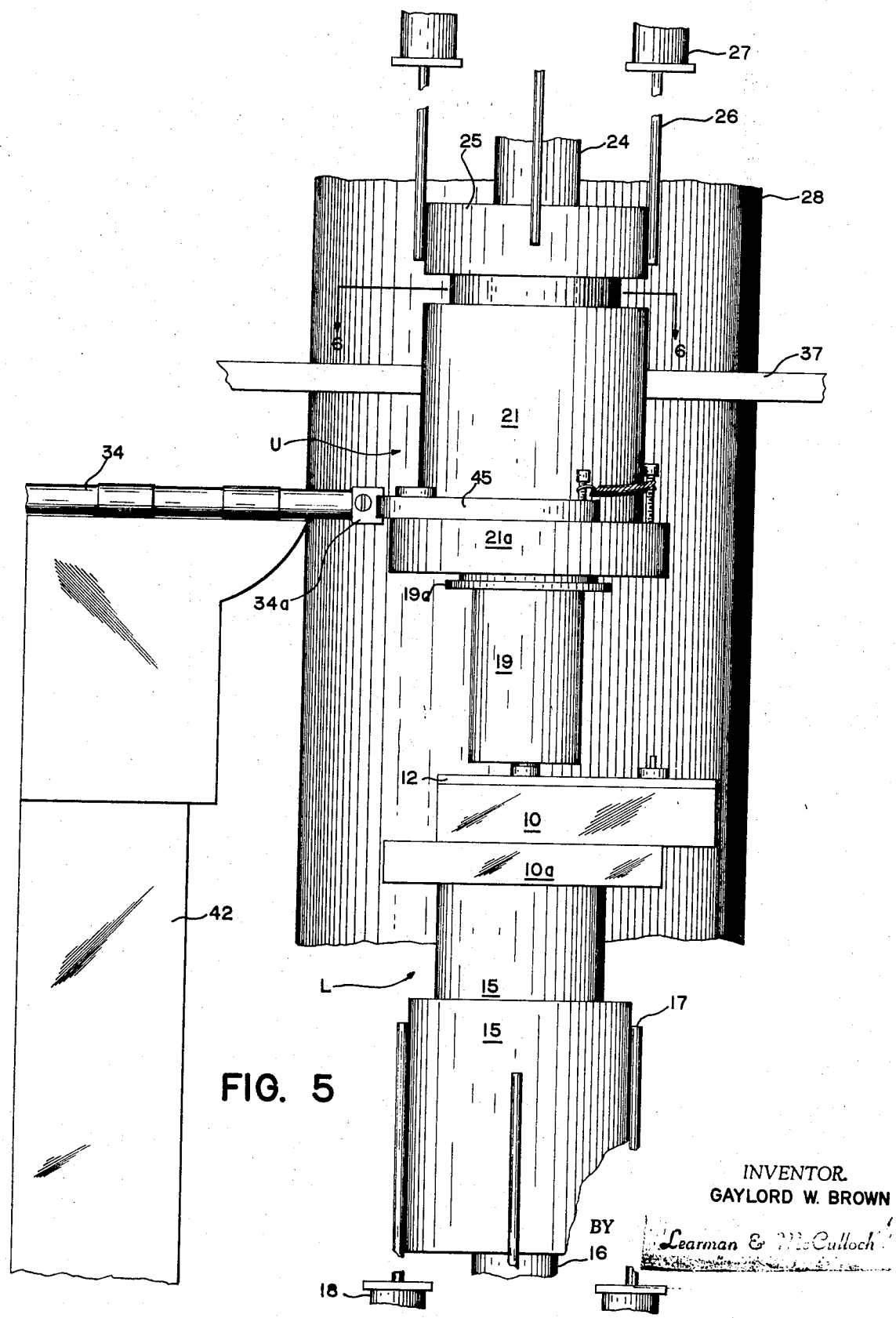
FIG. 5 is a similar view, with the part holding members shown in engaged friction welding position, and the stop for positively halting rotation of the upper work holder in a predetermined angular position, illustrated in engaged position.

Thereafter, cylinders 27 are deenergized to withdraw the upper part holding assembly U from the position shown in FIG. 5 to the position shown in FIG. 3 and cylinders 18 are deenergized to simultaneously withdraw the lower part holding assembly L. The part is then removed from the holder plate 10 and may be indexed thereon to a position in which another fixture 14 may be welded in another socket 13.

The machine and method described is illustrative only of machines and methods which may be used and the invention is defined in the claims.

We claim:

1. Friction welding apparatus for joining friction-weldable parts comprising: means for holding parts in engagement to be friction welded together; means for relatively revolving the parts to be friction welded together for a time to permit friction welding to occur; and means automatically responsive to a slowed speed of rotation of one of said parts for controlling ceasing of the relative rotation to dispose the parts in a predetermined relative angular welded orientation.

2. The combination defined in claim 1 in which said parts have an interference fit, one received by the other; and said latter means includes trapping mechanism and a trappable element.

3. The combination defined in claim 1 in which said means for relatively revolving the parts comprises disengageable drive means; and mechanism is provided for disengaging said drive means and moving said parts into engaged relation to permit friction welding after said means for relatively revolving the parts is disengaged.

4. The combination defined in claim 1 wherein said controlling means includes mechanism responsive to a centrifugal force condition.

5. The combination defined in claim 4 wherein said holder means includes a pair of axially aligned holders; said means for relatively revolving the holder means comprises means for rotating at least one of the holders; and said stopping means includes a stop, and said force responsive part comprises a latch carried by said one of said holders which is swingable from a radially inner position to a radially outer stop engaging position.

6. The combination defined in claim 5 in which means exerting a predetermined biasing force normally maintains said latch in stop engaging position.

7. The combination defined in claim 6 in which means carried by said one of said holders prevents rebound once the holder is stopped.

8. The combination defined in claim 7 in which said rebound preventing means comprises a like swingably mounted latch circumferentially spaced from said first mentioned latch, and also operating responsive to a centrifugal force condition.

9. The combination defined in claim 8 in which both said latches are simultaneously moved to radially outward stop engaging position by spring means when rotation of said one holder has decreased to a predetermined speed of rotation.

10. The combination defined in claim 5 in which said other holder is prevented from rotating and said stop is likewise prevented from rotating.

11. The combination defined in claim 5 in which said stopping means includes a generally radially extending member.

12. The combination defined in claim 5 in which said means for rotating said one of said holders comprises an endless drive member movable from a remote position in to engage said holder and thence outwardly again when said holder has achieved a predetermined speed of rotation; and means is provided for moving said holders relatively toward one another, after said drive member has been disengaged, to engage said parts.

13. Friction welding apparatus for joining friction weldable parts such as synthetic plastic parts of thermoplastic character comprising: axially aligned part holder means for holding parts to be engaged and friction welded together; means for relatively revolving the part holders; and means including a part on one of said holders responsive to centrifugal force for stopping the relative rotation of the part holder means when a friction weld is achieved in a relative disposition which locates the parts in a predetermined relative angular welded position.

14. A method of friction welding synthetic plastic parts of thermoplastic character comprising: engaging and relatively rotating the parts to be joined; physically sensing the imminent achievement of a friction weld of the parts; and stopping the relative rotation of the parts in a particular position of relative angular welded orientation.

15. The method defined in claim 14 wherein said sensing occurs just prior to completion of the friction weld and relative rotation of the parts is stopped substantially at the time the friction weld is complete.

16. A method of joining friction-weldable parts comprising the steps of: engaging and relatively rotating the parts to be joined for a time to permit friction welding to occur; and sensing a slowed relative rotation of said parts and halting the relative rotation to dispose the parts in a predetermined relative angular welded orientation upon sensing said slowed rotation.

References Cited

UNITED STATES PATENTS

| | | | |
|---|---|---|---|
| 3,562,073 | 2/1971 | Kibler | 156—580 |
| 3,316,135 | 4/1967 | Brown et al. | 156—580 X |
| 3,363,567 | 1/1968 | Dixon | 102—79 |

BENJAMIN A. BORCHELT, Primary Examiner

J. J. DEVITT, Assistant Examiner

U.S. Cl. X.R.

156—580